June 24, 1930. A. L. CLAPP 1,765,863
AUTOMOBILE SPRING COVER
Filed Oct. 29, 1927
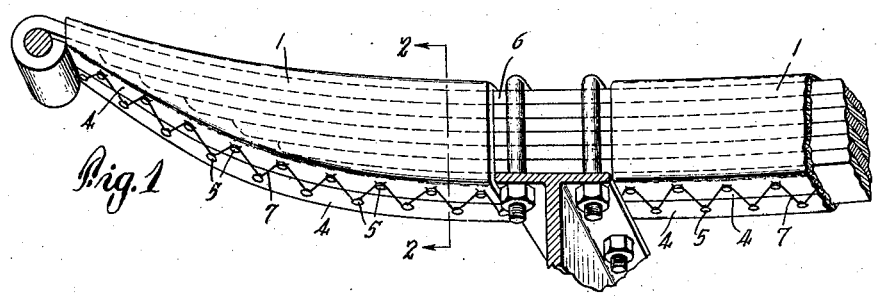
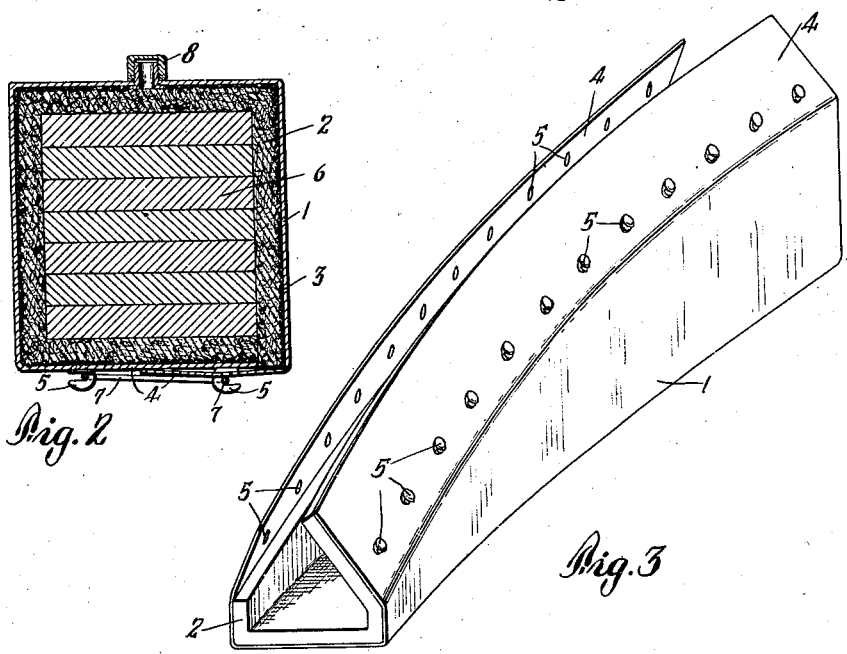
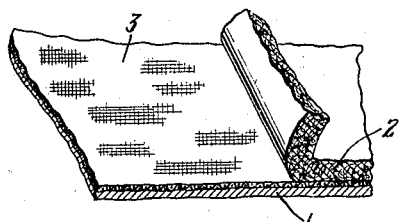
Inventor:
Albert L. Clapp.

Patented June 24, 1930

1,765,863

UNITED STATES PATENT OFFICE

ALBERT L. CLAPP, OF DANVERS, MASSACHUSETTS

AUTOMOBILE SPRING COVER

Application filed October 29, 1927. Serial No. 229,746.

This invention relates to covers such as are sometimes used for keeping a supply of lubricant against the springs of an automobile and for protecting such springs and lubricant against access of dirt and moisture.

Heretofore, covers of this kind have been constructed for use with grease or solid lubricants, the lubricant being packed in between the cover and the spring, the ends of the cover being tightly clamped against the spring to prevent the loss of lubricant. To obtain satisfactory lubrication in this way, it is necessary to keep a large excess of grease in the cover, but even in such case the grease frequently tends to cake, particularly in cold weather, and at best does not readily work its way in between the contacting surfaces of the spring leaves. Inasmuch as only that portion of the lubricant which is between the leaves functions, it is thus seen that if the excess grease becomes caked, it serves no useful purpose.

The object of the present invention is to provide a cover for automobile springs capable of use with oils or liquid lubricants which will not tend to cake or congeal, even in cold weather, and which will readily spread or flow in between the contacting surfaces of spring leaves. I have found that this object may be realized by lining the cover substantially throughout with a relatively thick pad of felted fibrous material capable of carrying a considerable amount of oil, and assembling the cover with its pad saturated with the oil in tight contact with the spring. The oil tends to flow by capillary action to the surface of the spring and to work its way in between the sliding surfaces of the leaves, this flow being augmented by the squeezing action exerted on the pad by the flexing of the spring while in use, so that there is little, if any, tendency for a spring thus lubricated to squeak at any time. Inasmuch as any free oil is quickly reabsorbed by the pad, the ends of the cover need not be clamped to the spring, this being particularly advantageous where more or less rigid covers which might crack or break, or cause squeaking or other noises if fixed to the spring, are used.

With the foregoing and other objects in view, my invention consists in the following features of construction and arrangement of parts, as will hereinafter be more fully described in conjunction with the accompanying drawings, wherein—

Figure 1 represents in perspective a cover made in accordance with the present invention, assembled with an automobile spring.

Figure 2 is a section on the line 2—2 of Figure 1.

Figure 3 shows in perspective the cover in an inverted position, detached from the spring and partly open.

Figure 4 illustrates a fragment of the cover with the pad partly raised.

Referring first to Figure 3 of the drawing, 1 indicates as a whole a cover which, for the purpose of illustration, is fashioned for assembly with a spring of semielliptic curvature. The cover may be of any suitable material, such as the flexible leather ordinarily employed for this purpose, but, as shown on the drawing, may be advantageously moulded to the desired form from more or less rigid material, for instance, fiberboard having waterproof and greaseproof properties such as described in my application for patent, Serial No. 201,405, filed June 25, 1927. The cover is lined substantially throughout with a relatively thick pad 2 of fibrous material capable of carrying or absorbing a large amount of oil, for instance of the character sometimes known as cylinder oil. The pad is preferably made of loosely felted animal fiber, such as wool and/or hair, as such fiber is capable of carrying a large amount of oil. Preferably, as shown in Figure 4, a layer of fabric 3 such as burlap, is placed between the pad 2 and the cover 1, and is adhesively secured to both pad and cover, thus serving to hold both united. To permit assembly with a spring, the cover is provided on its underside with a pair of separable flaps 4, one of which is engageable under the other to form an open-ended box fitting about a spring. Each of the flaps is shown provided with a row of hooks 5 permitting lacing assembly with a spring.

Before assembly, the pad 2 is saturated throughout with oil of any suitable lubricating quality. The flaps 4 are then sprung open and the cover pulled down over a spring 6, as shown in Figure 1, with the flaps 4 on the under side and thus normally obscured from view. The flaps 4 are then tied together by a lace 7 engaging the hooks of both flaps, as shown in Figure 1, the pad thus being squeezed into tight contact with the spring and caused to release an initial supply of lubricant, which gradually tends to work in between the sliding surfaces of the leaves, this being accelerated as the spring is flexed in operation. Capillary action further serves to cause a flow of oil onto the spring, this flow being augmented by the squeezing of the pad taking place when the spring is flexed, and the flexing further aiding in causing the oil to work in between the leaves. Suitable provision is preferably made for oiling the pad without disassembling the cover from the spring. To this end, one or more oil cups 8 communicating with the pad may be arranged along the upper side of the cover, so that oil may be fed into the oil cups from an oil can when desired. The oil flows onto the pad and tends to distribute itself by capillary action throughout the pad, and thus to afford a uniform lubrication of the entire spring.

It is thus seen that a cover constructed in accordance with the present invention may be assembled without attachment to the spring at any point, and at the same time offer excellent lubrication to the spring, as the relatively thick pad lining absorbs flexing of the spring, oil being squeezed therefrom at the same time, and the cover is free to flex when necessary. This makes possible the successful use of comparatively rigid materials, such as fiberboard of the character hereinbefore described, in the manufacture of the covers, this being particularly advantageous, as such fiberboard is far less expensive and at the same time is more resistant to deterioration by oil than leather.

I am aware of the fact that felt or other packing materials have sometimes been used at the ends of spring covers to prevent grease or semi-solid lubricants from escaping through the ends of the cover; but, so far as I am aware, the lining of an automobile spring cover, and more especially, a more or less rigid cover, with a relatively thick pad of felted fibrous material carrying a large quantity of oil and assembled for the purpose of lubricating the spring of an automobile, has not heretofore been known.

Having thus described an embodiment of this invention, it is evident that change and modification might be made therein without departing from the spirit or scope of invention as defined in the appended claims.

What I claim is:

1. As an article of manufacture, an automobile spring cover made of comparatively rigid fiberboard having waterproof and greaseproof properties and lined substantially throughout with a relatively thick pad of fibrous material capable of carrying a considerable amount of liquid lubricant 2. The combination with an automobile spring, of a moulded fiberboard cover having waterproof and greaseproof properties and lined substantially throughout with a relatively thick pad of loosely felted animal fiber carrying a large amount of liquid lubricant and in tight contact with said spring, said cover being unattached to said spring at any point.

In testimony whereof I have affixed my signature.

ALBERT L. CLAPP.